(12) United States Patent
Kusuda

(10) Patent No.: US 7,087,881 B2
(45) Date of Patent: Aug. 8, 2006

(54) SOLID STATE IMAGE PICKUP DEVICE INCLUDING AN INTEGRATOR WITH A VARIABLE REFERENCE POTENTIAL

(75) Inventor: Masayuki Kusuda, Nishinomiya (JP)

(73) Assignee: Minolta Co., Ltd., Osaka (JP)

( * ) Notice: Subject to any disclaimer, the term of this patent is extended or adjusted under 35 U.S.C. 154(b) by 167 days.

(21) Appl. No.: 10/614,480

(22) Filed: Jul. 7, 2003

(65) Prior Publication Data
US 2004/0065804 A1    Apr. 8, 2004

(30) Foreign Application Priority Data
Jul. 12, 2002    (JP) .............................. 2002-203893

(51) Int. Cl.
G01J 1/44    (2006.01)
H01L 27/00    (2006.01)

(52) U.S. Cl. .............................. 250/214 L; 250/208.1; 348/297; 348/310

(58) Field of Classification Search ............ 250/214 L, 250/208.1; 348/296, 297, 308, 310
See application file for complete search history.

(56) References Cited

U.S. PATENT DOCUMENTS 4,973,833 A * 11/1990 Takada et al. ........... 250/208.1
5,289,286 A    2/1994 Nakamura et al. .......... 348/223
5,861,621 A    1/1999 Takebe et al. ........... 250/214 R
6,201,617 B1 * 3/2001 Kusaka ........................ 358/482
6,836,291 B1 * 12/2004 Nakamura et al. ........... 348/301
2001/0013571 A1    8/2001 Kakumoto et al. ...... 250/208.1
2003/0197799 A1 * 10/2003 Dyas et al. .................. 348/308

FOREIGN PATENT DOCUMENTS

| JP | 11-313257 A | 11/1999 |
| JP | 2001-094878 A | 4/2001 |
| JP | 2001-223948 A | 8/2001 |

* cited by examiner

Primary Examiner—Stephone B. Allen
Assistant Examiner—Suezu Ellis
(74) Attorney, Agent, or Firm—Sidley Austin LLP

(57) ABSTRACT

In order to provide a solid state image pickup device in which an offset voltage in an image signal from which a noise signal is removed is made to be low, when an image pickup operation is performed while the MOS transistor T1 is ON, after a signal φVD with a value Vh is integrated by a capacitor C, the signal φVD is Vm (Vm<Vh) and a pulse signal φV is given so that an image signal is output. When dispersion of sensitivity is detected while the MOS transistor T1 is OFF, after the signal φVD with the value Vh is integrated by the capacitor C, the signal φVD is V1 (V1<Vm) and the pulse signal φV is given so that a noise signal is output.

18 Claims, 6 Drawing Sheets

SOLID STATE IMAGE PICKUP DEVICE INCLUDING AN INTEGRATOR WITH A VARIABLE REFERENCE POTENTIAL

This application is based on application No. JP 2002-203893 filed in Japan, the contents of which is hereby incorporated by reference.

BACKGROUND OF THE INVENTION

1. Field of the Invention

The present invention relates to an improved solid state image pickup device. More specifically, the invention relatives to the solid state image pickup device for correcting dispersion of sensitivity of pixels.

2. Description of the Related Art

In recent years, in order to enlarge a dynamic range in a solid state image pickup device having a photoelectric converting element such as a photodiode, a solid state image pickup device for outputting an electric signal which is converted natural logarithmically with respect to an incident light quantity is suggested. The applicants of the present invention suggest the solid state image pickup device for performing a logarithmically converting operation in Japanese Patent Application Laid-Open No. 11-313257 (1999) and the like. In such a solid state image pickup device, however, dispersion of sensitivity occurs between pixels due to a difference in a threshold voltage of MOS transistors for performing the photoelectric converting operation.

A differential amplifier is, therefore, provided accordingly, so as to output an image signal at the time of an image pickup operation and a noise signal showing the dispersion of sensitivity of each pixel. The differential amplifier subtracts the noise signal from the image signal so as to correct the dispersion of the sensitivity of each pixel.

In the solid state image pickup device for correcting the dispersion in such a manner, at the time of the structure in Japanese Patent Application Laid-Open No. 11-313257 (1999), since a voltage to be applied to a capacitor for integrating an electric signal obtained by the photoelectric conversion is constant, obtained image signal and noise signal are as shown in FIG. 8. FIG. 8 is a timing chart showing a change in a voltage value of a capacitor C at the time of integrating and reading the image signal and the noise signal. The image signal in FIG. 8 is obtained when a quantity of incident light to the pixels is minimum, and the MOS transistor composing the solid state image pickup device is a P-channel MOS transistor.

With reference to FIG. 8, since the image signal is obtained when a quantity of incident light to the pixels is minimum, a voltage value Vcs1−Vcn1, which is a difference between a voltage value Vcs1 at the time of outputting the image signal and a voltage value Vcn1 at the time of outputting the noise signal, becomes a voltage value as an origin of an offset voltage of the image signal from which a noise is removed. In recent years, however, according to refining of a semiconductor chip, a power source voltage to be applied to the solid state image pickup device is lowered, and thus an effective range of a voltage for operating an a output buffer and an AD converter in the solid state image pickup device becomes narrow. Since integrating time of the image signal is nearly 10000 times as long as integrating time of the noise signal, it is found from FIG. 8 that the voltage value of the image signal is lower than the noise signal, and thus the offset voltage becomes high.

In the prior solid state image pickup device, therefore, since a ratio of the offset voltage becomes large in the voltage within the narrow effective operating range, a value Vs−Vn−Vk, which is obtained by subtracting an offset voltage Vk from a differential value Vs−Vn between an image signal Vs and a noise signal Vn becomes low. As a result, a ratio of the voltage utilized for a signal becomes small and its gradation might be deteriorated.

OBJECTS AND SUMMARY

The present invention is devised in order to solve the above problems, and its object is to provide an improved solid state image pickup device. More specifically, its object is to provide the improved solid state image pickup device for correcting dispersion of sensitivity of pixels. Concretely, its object is to provide the solid state image pickup device in which an offset voltage in an image signal from which a noise signal is removed is lowered.

In order to achieve the above objects and an other object, a solid state image pickup device from a certain aspect of the present invention has: a photoelectric converting circuit for generating an electric signal proportional to a logarithm value of an incident light quantity; an integrating circuit for integrating the electric signal from the photoelectric converting circuit; and an output circuit for outputting the electric signal proportional to a value obtained by integrating the logarithm value of the incident light quantity. A reference voltage for integrating the electric signal from the photoelectric converting circuit is applied to the integrating circuit, and an electric potential of the reference voltage is variable.

In such a structure from another aspect, when the electric signal obtained by integrating in the integrating circuit is led to the output circuit, the electric potential of the reference voltage may be temporarily changed.

In another aspect, an electric signal, which is obtained by integrating an electric signal generated from the photoelectric converting circuit at the time of an image pickup operation by means of the integrating circuit, is an image signal, and an electric signal, which is obtained by integrating an electric signal generated from the photoelectric converting circuit at the time of detecting a noise occurring due to the photoelectric converting characteristics of the photoelectric converting circuit by means of the integrating circuit, is a noise signal. At this time, when the image signal and the noise signal are led to the output circuit, the electric potential of the reference voltage is changed. As a result, when a noise is removed from the image signal by the output noise signal, the offset of the image signal from which the noise is removed can be reduced.

A solid state image pickup device from still another aspect has: a photoelectric converting element for generating an electric signal according to a quantity of incident light; an MOS transistor, to which a predetermined bias voltage is applied and which converts the electric signal output from the photoelectric converting element into an electric signal proportional to a logarithm value of the incident light quantity so as to output the electric signal; and a capacitor, in which the electric signal output from the MOS transistor is given to its one end so as to be integrated. A reference voltage whose electric potential is variable is applied to the other end of the capacitor.

In such a structure from another aspect, the device is provided with an output signal line for outputting the electric signal obtained by integration by means of the capacitor, and a first switch for electrically connecting and disconnecting the capacitor and the output signal line. The electric potential of the reference voltage is changed in synchronization with an ON/OFF operation of the first switch.

At this time, the device is provided with a second switch for electrically connecting and disconnecting the photoelectric converting element and the MOS transistor, and when a difference in the sensitivity due to threshold characteristics of the MOS transistor is detected, the electric signal which is obtained by accumulating the electric signal output from the MOS transistor into the capacitor in the state that the second switch is OFF, is led to the output signal line as the noise signal. At this time, the electric potential of the reference voltage to be applied to the capacitor may be changed.

The device is provided with the second switch for electrically connecting and disconnecting the photoelectric converting element and the MOS transistor, and when the image pickup operation is performed, an electric signal, which is obtained by accumulating the electric signal output from the MOS transistor into the capacitor in the state that the second switch is ON is led as the image signal to the output signal line. At this time, the electric potential of the reference voltage to be applied to the capacitor may be changed.

The device is provided with the second switch for electrically connecting and disconnecting the photoelectric converting element and the MOS transistor, and when the image pickup operation is performed, the electric signal, which is obtained by accumulating the electric signal output from the MOS transistor into the capacitor in the state that the second switch is ON, is led as the image signal to the output signal line. At this time, the electric potential of the reference voltage to be applied to the capacitor is changed. When the difference in the sensitivity due to the threshold characteristics of the MOS transistor is detected, an electric signal, which is obtained by accumulating the electric signal output from the MOS transistor into the capacitor in the state that the second switch is OFF, is led as the noise signal to the output signal line. At this time, the electric potential of the reference voltage to be applied to the capacity may be changed.

At this time, the reference voltage has ternary, and a change width of the electric potential of the reference voltage at the time of leading the image signal is set to be larger than a change width of the electric potential of the reference voltage at the time of leading the noise signal, so that the offset generated in the image signal from which the noise is removed by differentiating the image signal and the noise signal can be reduced.

A solid state image pickup device from still another aspect includes: a plurality of pixels having a photoelectric converting element for generating an electric signal according to a quantity of incident light, an MOS transistor to which a predetermined bias voltage is applied and which converts the electric signal output from the photo electric converting element into an electric signal proportional to a logarithm value of the incident light quantity so as to output the electric signal, and a capacitor in which the electric signal output from the MOS transistor is given to its one end so as to be integrated; and an output signal line for leading output signals output from the pixels. Each of the pixels includes: a first switch for electrically connecting and disconnecting the photoelectric converting element and the MOS transistor; and a second switch for electrically connecting and disconnecting the integrating capacitor and the output signal line. When a reference voltage whose electric potential is variable is applied to the other end of the capacitor and an image pickup operation is performed, an electric signal, which is obtained by logarithmically converting an electric signal from the photoelectric converting element by means of the MOS transistor in a state that the first switch is ON, is integrated by the capacitor so that an image signal is generated, and the image signal is output to the output signal line in a state that the second switch is ON. When dispersion of sensitivity of the pixels is detected, a noise signal is generated in such a manner that the capacitor integrates an electric signal according to threshold characteristics of the MOS transistor in a state that the first switch is OFF. The noise signal is output to the output signal line in a state that the second switch is ON, and the electric potential of the reference voltage is changed in synchronization with the operation of the second switch.

In such a structure, when the noise signal is output to the output signal line, the electric potential of the reference voltage may be changed, or when the image signal is output to the output signal line, the electric potential of the reference voltage may be changed.

When the noise signal and the image signal are output to the output signal line respectively, the electric potential of the reference voltage may be changed. At this time, a change width of the electric potential of the reference voltage becomes large at that time of outputting the image signal.

The MOS transistor may be a P-channel MOS transistor. At this time, when the noise signal and the image signal are output to the output signal line, the electric potential of the reference voltage is changed to a negative direction.

The MOS transistor may be an N-channel MOS transistor. At this time, when the noise signal and the image signal are output to the output signal line, the electric potential of the reference voltage is changed to a positive direction.

BRIEF DESCRIPTION OF THE DRAWINGS

These and other objects and features of the present invention will become apparent from the following description of preferred embodiments thereof taken in conjunction with the accompanying drawings; in which.

In the following description, like parts are designated by like reference numbers throughout the several drawings.

DETAILED DESCRIPTION OF THE PREFERRED EMBODIMENTS

Embodiments of the present invention will be explained below with reference to the drawings.

1. Configuration of Solid State Image Pickup Device

Figure 1:
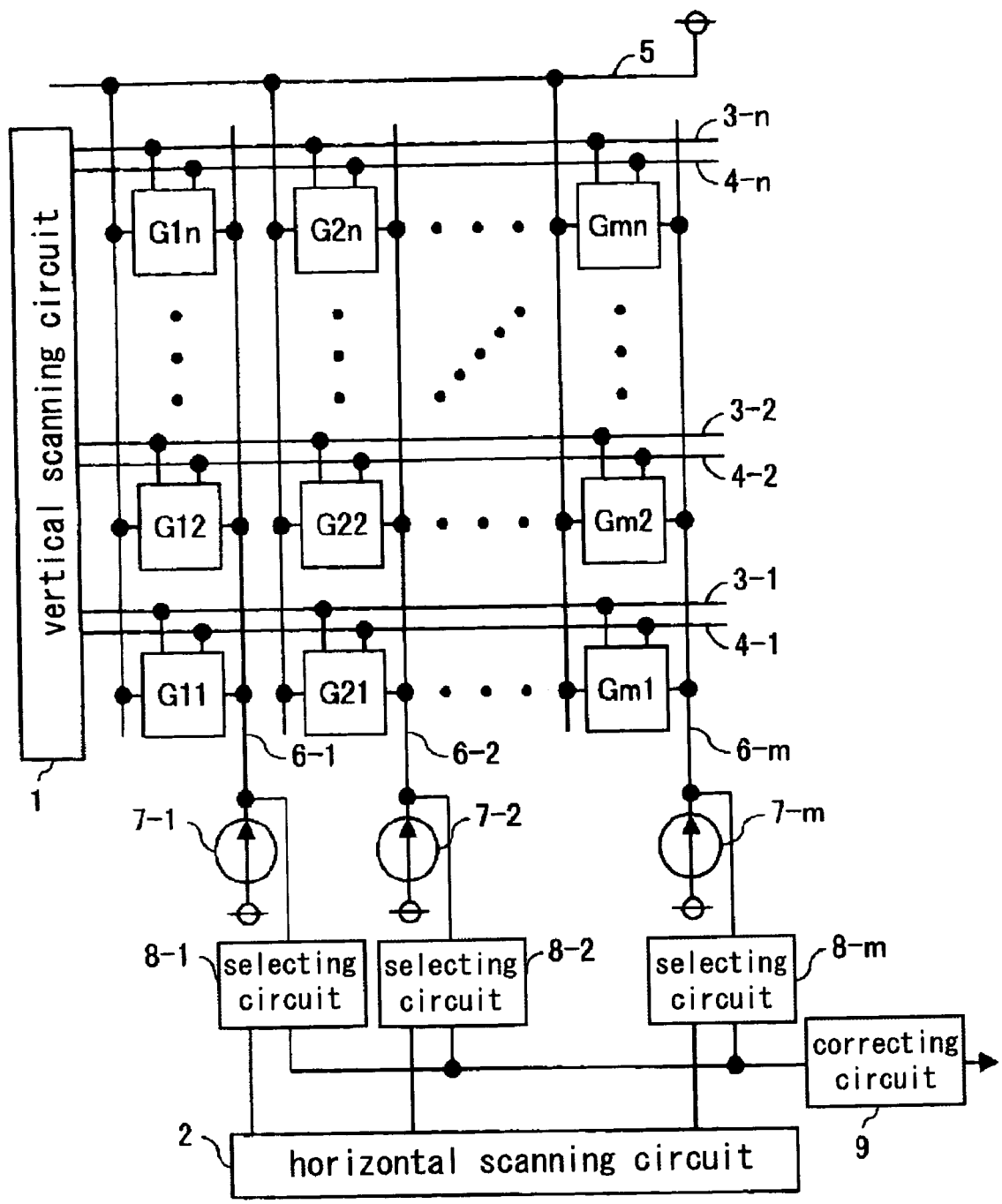
FIG. 1 is a block circuit diagram showing a configuration of a solid state image pickup device.

The solid state image pickup device according to the present embodiment will be explained with reference to FIG. 1. FIG. 1 is a block diagram showing a configuration of the solid state image pickup device according to the embodiment.

In FIG. 1, G11 to Gmn designate pixels arranged in a matrix pattern. 1 designates a vertical scanning circuit and it sequentially scans lines 3-1, 3-2, ..., 3-n for giving a signal φV to pixels and gives a signal φVD to the pixels via lines 4-1, 4-2, ..., 4-n. 2 designates a horizontal scanning circuit, and it sequentially reads a photoelectric converting signal guided from the pixels to output signals 6-1, 6-2, ... 6-m in a horizontal direction per pixel. 5 designates a power source line. The pixels are connected with not only the lines 3-1 through 3-n and 4-1 through 4-n, the output signal lines 6-1 through 6-m and the power sources line 5 but also another lines (for example, a clock line, a bias supply line and the like), but they are omitted in FIG. 1.

The output signal lines 6-1 through 6-m are connected with constant-current sources 7-1 through 7-m, respectively, and selecting circuits 8-1 through 8-m are provided. The selecting circuits 8-1 through 8-m sample and hold image signals and noise signals given from the pixels G11 through Gmn via the signal lines 6-1 through 6-m, respectively. When the image signals and the noise signals are sequentially transmitted from the selecting circuits 8-1 through 8-m to a correcting circuit 9, the correcting circuit 9 performs a correcting process so as to output an image signal from which a noise is removed to the outside. A DC voltage VPS is applied to one ends of the constant-current sources 7-1 through 7-m.

In such a solid state image pickup device, the image signal and the noise signal to be an output from a pixel Gab (a: natural number such that 1≦a≦m, b: natural number such that 1≦b≦n) are output via the output signal line 6-a, and the constant-current source 7-a connected with the output signal line 6-a amplifies the image signal and the noise signal. The image signal and the noise signal output from the pixel Gab are successively transmitted to the selecting circuit 8-a, and the selecting circuit 8-a samples and holds the transmitted image signal and the noise signal.

After the selecting circuit 8-a transmits the sampled and held image signal to the correcting circuit 9, it transmits the sampled and held noise signal to the correcting circuit 9. The correcting circuit 9 corrects the image signal given from the selecting circuit 8-a based on the noise signal given from the selecting circuit 8-a so as to output the image signal from which the noise is removed to the outside. The applicants of the present invention suggest a configuration in Japanese patent Application Laid-Open No. 2001-223948 as one example of a configuration of the selecting circuit 8-1 through 8-n and the correcting circuit 9. The correcting circuit may be provided to a configured position of the selecting circuits 8-1 through 8-n.

2. Structural Example of Pixels

Figure 2:
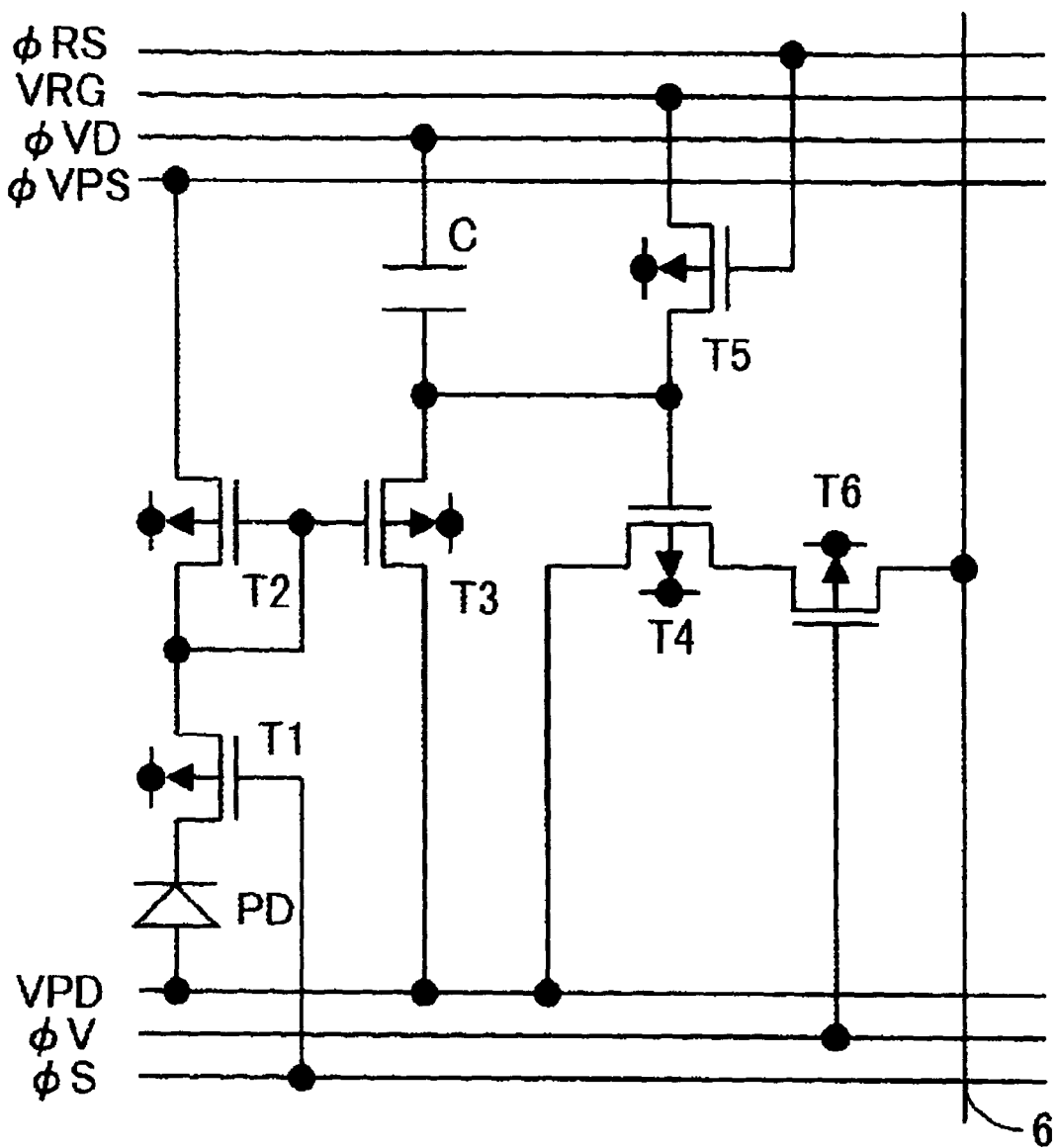
FIG. 2 is a circuit diagram showing a configuration of pixels in the solid state image pickup device of FIG. 1.

One example of a structure of the pixels G11 through Gmn provided in the solid state image pickup device of FIG. 1 will be explained below with reference to FIG. 2. In the pixels of FIG. 2, a DC voltage VPD is applied to a cathode of a photodiode PD, and an anode of the photodiode PD is connected with a drain of an MOS transistor T1, and a source of the MOS transistor T1 is connected with a gate and a drain of an MOS transistor T2 and a gate of an MOS transistor T3.

A source of the MOS transistor T3 is connected with a gate of an MOS transistor T4 and a drain of an MOS transistor T5, and a source of the MOS transistor T4 is connected with a drain of an MOS transistor T6. A drain of the MOS transistor T6 is connected with the output signal line 6 (corresponding to the output signal lines 6-1 through 6-m in FIG. 1). The MOS transistors T1 through T6 are P-channel MOS transistors.

A signal φVPS is input into a source of the MOS transistor T2, and the DC voltage VPD is applied to drains of the MOS transistors T3, T4. The source of the MOS transistor T3 is connected with the other end of a capacitor C, in which a signal φVD is given to one end. A DC voltage VRG is input into a source of the MOS transistor T5, and a signal φRS is input into its gate. Signals φS, φV are input into gates of the MOS transistors T1, T6, respectively.

In the pixels having such a structure, the constant-current source 7 (corresponding to the constant-current sources 7-1 through 7-m in FIG. 1), in which the DC voltage VPS is applied to its one end, is connected with a source of the MOS transistor T4 via the MOS transistor T6 and the output signal line 6. When the MOS transistor T6 is ON, therefore, the MOS transistor T4 operates as an MOS transistor of a source follower so as to output a voltage signal amplified by the constant-current source 7 to the output signal line 6.

The source follower circuit is configured in such a manner, so that an amplifying circuit for outputting a large signal is configured. Since the amplifying circuit amplifies a signal sufficiently largely, therefore, a process in a following signal processing circuit (not shown) becomes easy. The constant-current sources 7-1 through 7-m composing a load resistance portion of the amplifying circuit is not provided into the pixels but provided on each of the output signal lines 6-1 through 6-m to which a plurality of the pixels arranged in a matrix pattern are connected. As a result, a number of the load resistances and the constant-current sources can be reduced, thereby reducing an area of the amplifying circuit occupying a semiconductor chip.

An image pickup operation and an operation for detecting the sensitivity dispersion in the pixels having such a structure will be explained below. The signal φVPS is a binary voltage signal, and a voltage for operating the MOS transistor T2 in a subthreshold area is set to be low, and a voltage, for enabling a large electric current which is higher than the voltage and is larger than the time of giving the low signal φVPS to flow in the MOS transistor T2, is set to be high. The signal φVD is a ternary voltage signal, and a voltage at the time of performing the integrating operation of the capacitor C has a highest value Vh, and a voltage at the time of reading the image signal has a lower value Vm than Vh, and a voltage at the time of reading the noise signal has a lower value Vl than Vm.

(1) Image Pickup Operation (at the Time of Outputting the Image Signal)

An operation when the pixels pick up an image shown in FIG. 2 will be explained below. A signal φS is always low during the image pickup operation and when the MOS transistor T1 is ON. A signal φRS is set to be high, and the MOS transistor T5 is turned OFF. The signal φVPS to be given to the source of the MOS transistor T2 is set to below so that the MOS transistor T2 operates in the subthreshold area, and a voltage of the signal φVD to be given to the capacitor C has the value Vh so that the integrating operation is performed. At this time, when light enters the photodiode PD, a photo current is generated, and a voltage which has a value obtained by converting the photo current natural logarithmically is generated at the gates of the MOS transistors T2, T3 due to subthreshold properties of the MOS transistor.

A drain current, which is obtained by amplifying an electric current of a voltage proportional natural-logarithmically to an incident light quantity in the MOS transistor T3, flows from the capacitor C, so that the capacitor C is discharged. A gate voltage of the MOS transistor T4, therefore, becomes a voltage proportional natural-logarithmically to an integrating value of the incident light quantity. In order to read the image signal which appears by the integration by means of the capacitor C, the voltage of the signal φVD is set to have the value Vm, and a pulse signal φV is given to the MOS transistor T6. A source current according to the gate voltage of the MOS transistor T4, therefore, flows to the output signal line 6 via the MOS transistor T6.

At this time, since the MOS transistor T4 operates as a source follower type MOS transistor, the image signal appears in the output signal line 6 as a voltage signal. The signal φV is set to be high so that the MOS transistor T6 is turned OFF, and the voltage of the signal φVD has the value Vh. Since the image signal which is output via the MOS transistors T4, T6 in such a manner has a value proportional to the gate voltage of the MOS transistor T4, the integrating value of the quantity of the incident light to the photodiode PD becomes a signal converted natural-logarithmically.

(2) Operation for Detecting Sensitivity Dispersion (at the Time of Outputting Noise Signal)

Figure 3:
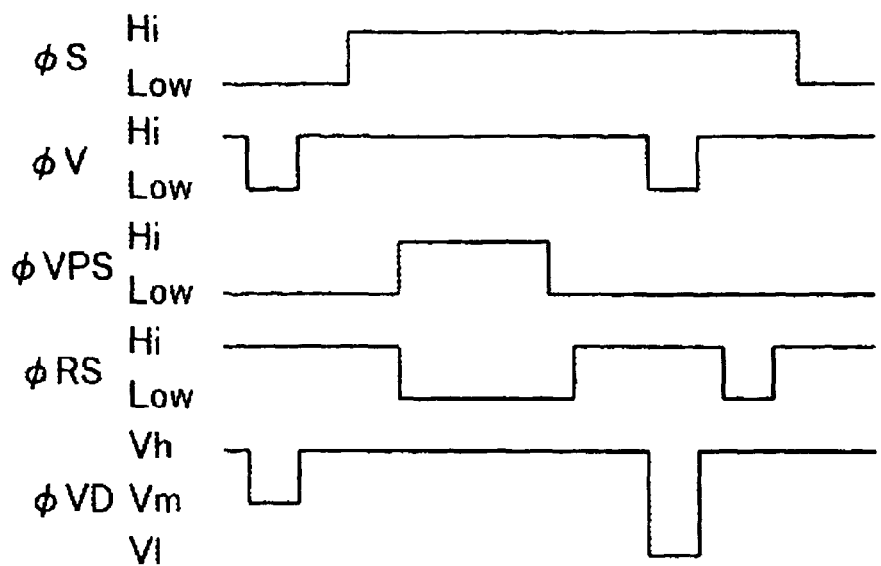
FIG. 3 is a timing chart showing an operation of the pixels in FIG. 2.

An operation for detecting sensitivity dispersion of the pixels will be explained below with reference to the timing chart in FIG. 3. When the pulse signal φVD with the voltage value Vm and the pulse signal φV are given and the image signal is output, after the signal φVD is set to have the value Vh, the signal φS is set to be high and the MOS transistor T1 is turned OFF, so that a reset operation starts. At this time, positive electric charges flow from the source of the MOS transistor T2 so as to be recouped with negative electric charges accumulated at the gate and drain of the MOS transistors T2 and the gate of the MOS transistor T3, and potential of the gate and drain of the MOS transistor T2 rises to a certain degree.

When, however, the potential of the gate and drain of the MOS transistor T2 rises to a certain degree, its reset speed becomes slow. Particularly when a bright subject becomes suddenly dark, this tendency becomes remarkable. The signal φVPS to be next given to the source of the MOS transistor T2 is, therefore, set to be high. When the source voltage of the MOS transistor T2 is set to be high in such a manner, a quantity of the positive electric charges which flow from the source of the MOS transistor T2 increases, so that the positive electric charges are recouped with the negative electric charges accumulated at the gate and the drain of the MOS transistor T2 and the gate of the MOS transistor T3 quickly. At this time, the signal φRS is set to be low and the MOS transistor T5 is turned ON, so that a voltage of a connecting node between the capacitor C and the gate of the MOS transistor T4 is initialized.

When the potential of the gate and drain of the MOS transistor T2 becomes higher by setting the signal φVPS high, the signal φVPS to be given to the source of the MOS transistor T2 is set to be low, so that the potential state of the MOS transistor T2 is returned to an original state. When the potential state of the MOS transistor T2 is returned to the original state in such a manner, the signal φRS is set to be high and the MOS transistor T5 is turned OFF.

The capacitor C performs the integrating operation, so that the voltage of the connecting node between the capacitor C and the gate of the MOS transistor T4 complies with the reset gate voltage of the MOS transistor T2. The pulse signal φV is given to the gate of the MOS transistor T6 so that the MOS transistor T6 is turned ON, and the voltage of the signal φVD is set to the value V1, so that an output current, which represents the sensitivity dispersion of the pixels caused by dispersion of the properties of the MOS transistors T2, T3, flows from the output signal line 6.

At this time, since the MOS transistor T4 operates as the source follower type MOS transistor, the noise signal appears as the voltage signal in the output signal line 6. After the pulse signal φRS is again given to the MOS transistor T5 so that the voltage of the connecting node between the capacitor C and the gate of the MOS transistor T4 is reset, the signal φS is set to be low and the MOS transistor T1 is conducted, so that the image pickup operation can be performed.

(3) State of Signal Output at the Time of Respective Operations

Figure 4:
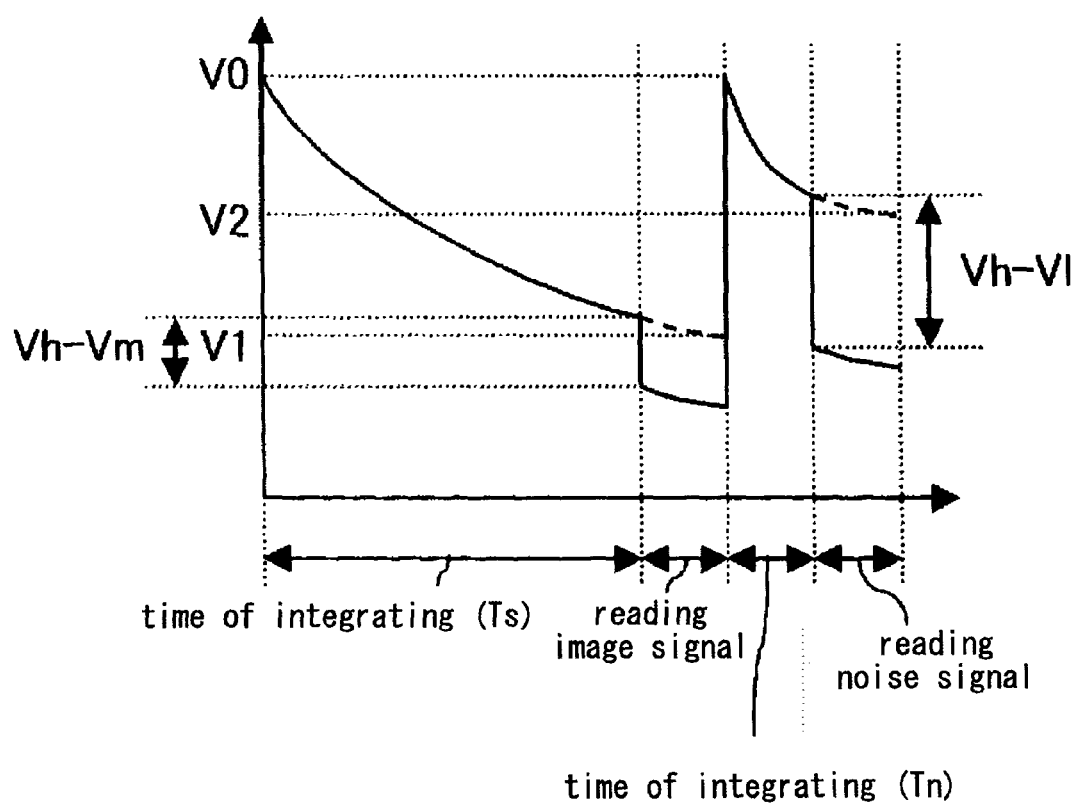
FIG. 4 is a timing chart showing a change in a voltage value of a capacitor in the pixels of FIG. 2.

A state transition of the capacitor C at the time of performing the image pickup operation and the operation for detecting the sensitivity dispersion will be explained blow with reference to FIG. 4. FIG. 4 is the timing chart showing a change in the voltage value of the capacitor C at the time of integrating and reading the image signal and the noise signal.

At the time of integrating the image signal, since the voltage of the signal φVD is set to the value Vh as mentioned above, the voltage value becomes lower than a voltage value V0 as an initial value according to the quantity of the incident light to the pixels as the time passes. After predetermined time Ts passes, the image signal is read at the voltage value Vm of the signal φVD. At this time, when a voltage value at the time of outputting the image signal in the case where the voltage value of the signal φVD is Vh and is constant (portion shown by a dotted line in FIG. 4) is supposed to be V1, the voltage value of the capacitor C becomes V1−(Vh−Vm), and thus the value of the image signal becomes a×(V1+Vm−Vh).

At the time of integrating the noise signal, similarly, since the voltage value of the signal φVD is Vh as mentioned above, the voltage value of the capacitor C becomes lower than the voltage value V0 as the initial value according to the quantity of the incident light to the pixels as the time passes. After predetermined time Tn passes, the noise signal is read at the voltage value V1 of the signal φVD. At this time, when the voltage value at the time of outputting the image signal in the case where the voltage value of the signal φVD is Vh and is constant (portion shown by a dotted line in FIG. 4) like a conventional manner is supposed to be V2, the voltage value of the capacitor C becomes V2−(Vh−V1), and thus the value of the noise signal becomes a×(V2+V1−Vh).

As a result, when the noise signal is subtracted from the image signal so that the noise is removed from the image signal, a value of the image signal from which the noise is removed becomes:

$$a \times ((V1+Vm-Vh)-(V2+V1-Vh))$$

$$= a \times ((V1-V2)-(V1-Vm)).$$

Since a×V1=Vn and a×V2=Vs, the value of the image signal from which the noise is removed can be represented by (Vs−Vn)−a×(V1−Vm). Since Vs−Vn conventionally includes an offset voltage Vk, a portion to be conventionally utilized as the image signal is such that Vo=Vs−Vn−Vk. In this embodiment, therefore, since the value of the image signal from which the noise is removed becomes Vo+Vk−a×(V1−Vm), the offset value becomes Vk−a×(V1−Vm), so that an occupying ratio can be lower than the conventional art.

In this embodiment, the voltage value of the signal φVD to be given to the capacitor C is set to be low at the time of reading the image signal and to be lower at the time of reading the noise signal. The voltage value of the signal φVD to be given at the time of reading the image signal, however, may be higher than the voltage value at the time of the integrating. That is to say, the value of the voltage to be applied to the capacitor C at the time of reading the image signal is set to be higher than the value of the voltage to be applied to the capacitor C at the time of reading the noise signal, so that the offset voltage in the image signal after the removal of the noise can be suppressed.

Figure 5:
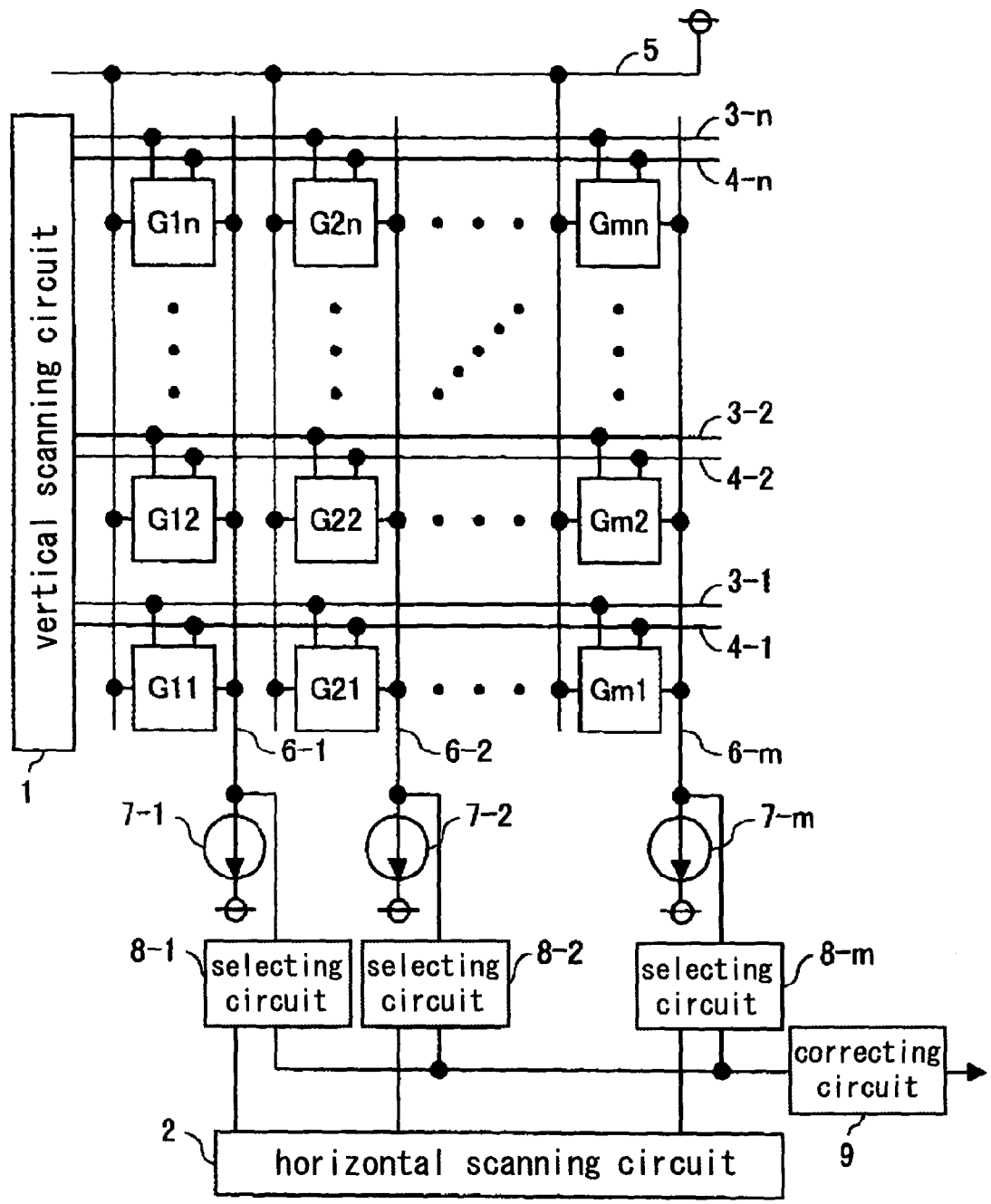
FIG. 5 is a block circuit diagram showing a configuration of the solid state image pickup device.

In this embodiment, the pixels are constituted by using the P-channel MOS transistors, but they may be constituted by using N-channel MOS transistors. At this time, since polarity of the elements is reversed, as shown in FIG. 5, polarity of the constant-current sources 7-1 through 7-m provided to the solid state image pickup device is opposite to that in FIG. 1. A relationship of the lines and the blocks in the solid state image pickup device is similar to that in FIG. 1 except that the elements in the respective blocks have the opposite polarity.

Figure 6:
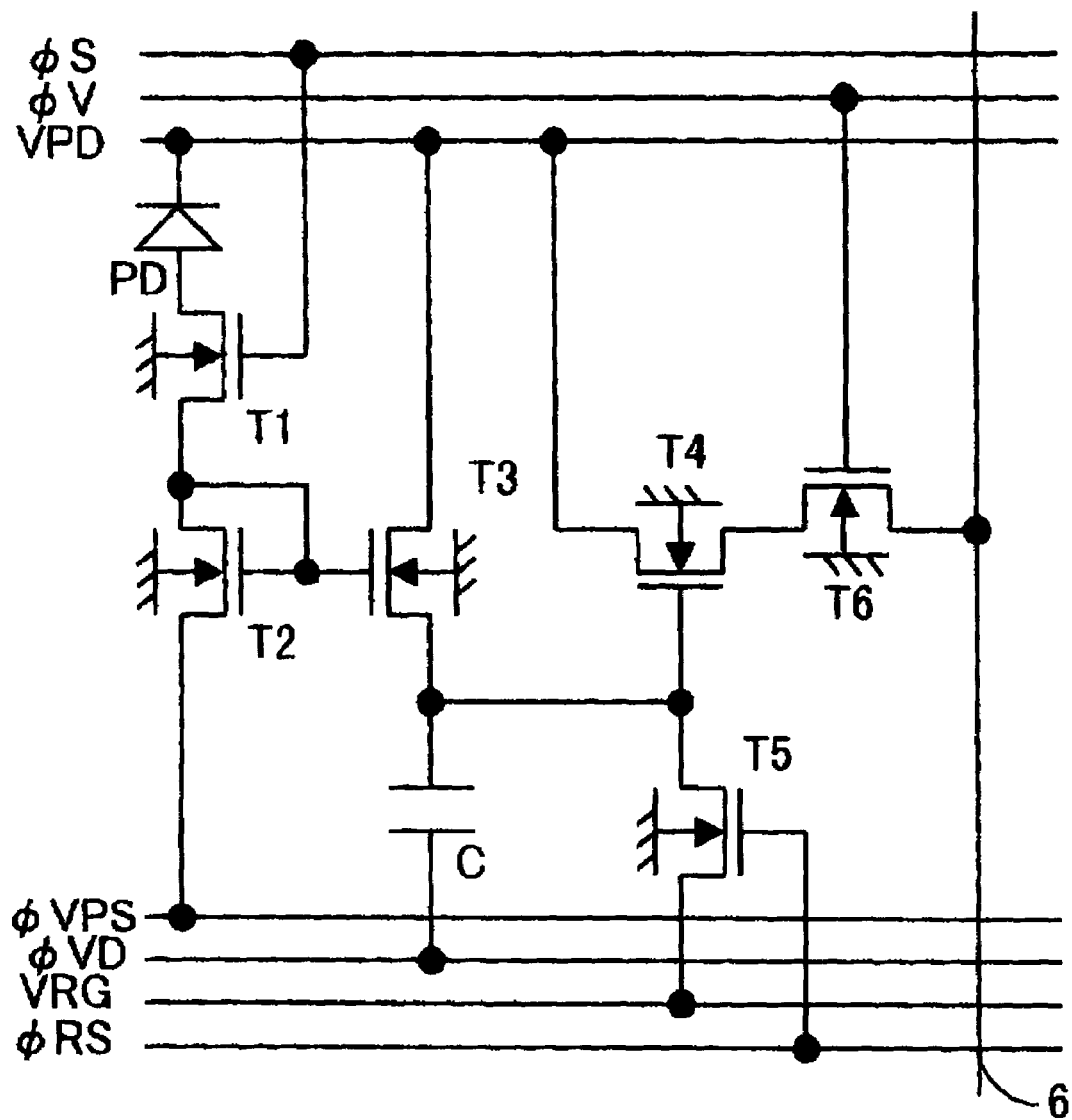
FIG. 6 is a circuit diagram showing a configuration of the pixels in the solid state image pickup device of FIG. 5.

The MOS transistors composing the pixels at this time are of the N channel, and it is shown in FIG. 6. The connecting relationship between the MOS transistors T1 through T6 and the capacitor C and the role of the elements are the same as those in FIG. 2, and the elements perform the operation according to the opposite polarity to FIG. 2. That is to say, the voltage value of the signal φVD is set to a lowest value Va at the time of integrating the image signal and the noise signal, and to an intermediate value Vb at the time of reading the image signal, and to be a highest value Vc at the time of reading the noise signal.

Figure 7:
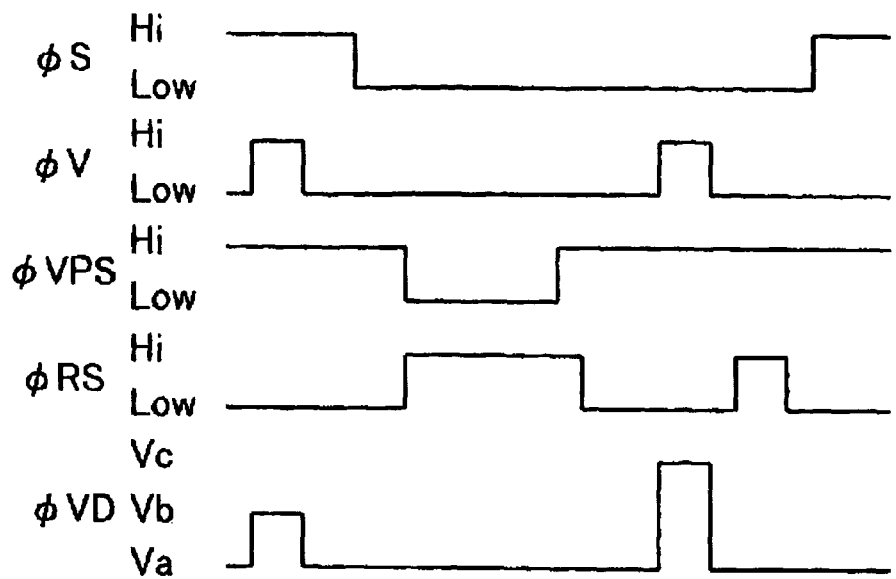
FIG. 7 is a timing chart showing an operation of the pixels in FIG. 6.
Figure 8:
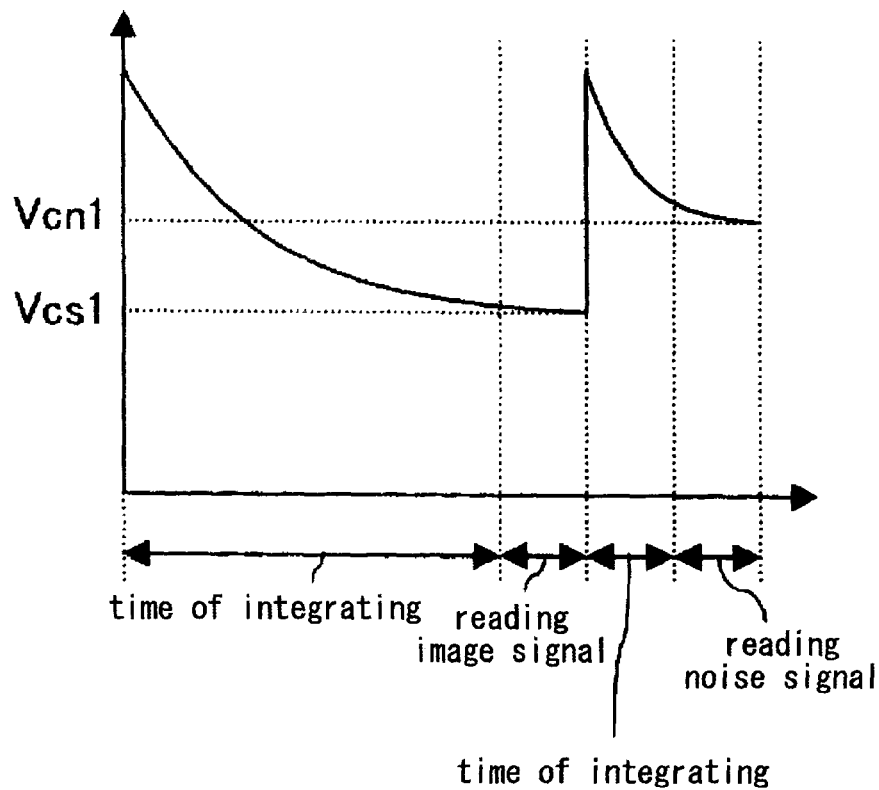
FIG. 8 is a timing chart showing a change in a voltage value of a capacitor in prior pixels.

The timing at which the signals φVPS, φVD, φS, φRS and φV to be given to the pixels when the MOS transistors composing the pixels are of the N channel change is as shown in FIG. 7. That is to say, a relationship in "high" and "low" of the signals φVPS, φVD, φS, φRS and φV is set to be opposite to FIG. 3, so that the operational timing of the MOS transistors T1, T2, T5 and T6 can be the same as each other. The timing at which the signals φVD with the voltage values Vh, Vm and V1 in FIG. 3 are given is made to be the same as the timing at which the signals φVD with the voltage values Va, Vb and Vc in FIG. 7 are given, so that the operating state of the capacitor C when the MOS transistors T1 through T6 have opposite polarity can be similar to the state in the embodiment at the respective timings.

As mentioned above, according to the present invention, when the electric potential of the reference voltage to be given to the integrating circuit for outputting the image signal or the noise signal or the capacitor is made to be variable, the electric potential of the reference voltage to be given at the time of the integrating operation and reading the signals can be changed. The electric potential of the reference voltage to be given are different in such a manner at the time of the integrating operation and the reading the signals, so that the offset of the electric signal to be output can be adjusted.

When the offset of the image signal and the noise signal is adjusted, the offset of the image signal from which the noise is removed by differentiating the noise signal and the image signal can be reduced. Since the offset of the image signal can be, therefore, adjusted according to an operating range of the output buffer and the AD converter to be connected with a next stage, the operating range can be utilized effectively.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A solid state image pickup device comprising:
   a photoelectric converting circuit for generating an electric signal proportional to a logarithm value of an incident light quantity;
   an integrating circuit for integrating the electric signal from the photoelectric converting circuit; and
   an output circuit for outputting an output electric signal proportional to a value obtained by integrating the logarithm value of the incident light quantity based on the electric signal integrated by the integrating circuit,
   wherein a reference voltage for integrating the electric signal from the photoelectric converting circuit is applied to the integrating circuit, and an electric potential of the reference voltage is variable and
   wherein when the electric signal obtained by integrating in the integrating circuit is led to the output circuit, the electric potential of the reference voltage is temporarily changed.

2. A solid state image pickup device according to claim 1, wherein an image signal is obtained by integrating the electric signal generated from the photoelectric converting circuit at the time of an image pickup operation by means of the integrating circuit, and a noise signal is obtained by integrating the electric signal generated from the photoelectric converting circuit at the time of detecting a noise occurring due to the photoelectric converting characteristics of the photoelectric converting circuit by means of the integrating circuit.

3. A solid state image pickup device according to claim 2, wherein the output circuit includes
   first holding circuit for holding the image signal,
   second holding circuit for holding the noise signal, and
   a differential circuit for removing the noise signal from the image signal.

4. A solid state image pickup device according to claim 1 further comprising:
   an amplifier for amplifying the electric signal integrated by the integrating circuit.

5. A solid state image pickup device comprising:
   a photoelectric converting element for generating a first electric signal according to a quantity of incident light;
   an MOS transistor, to which a predetermined bias voltage is applied and which converts the first electric signal output from the photoelectric converting element into a second electric signal proportional to a logarithm value of the incident light quantity so as to output the second electric signal;

a capacitor, in which the second electric signal output from the MOS transistor is given to its one end so as to be integrated; and an output signal line for outputting a third electric signal obtained by integration by means of the capacitor; and a first switch for electrically connecting and disconnecting the third electric signal to the output signal line, wherein a reference voltage whose electric potential is variable is applied to the other end of the capacitor and wherein the electric potential of the reference voltage is changed in synchronization with an ON/OFF operation of the first switch.

6. A solid state image pickup device according to claim 5 further comprising:

a second switch for electrically connecting and disconnecting the photoelectric converting element and the MOS transistor, wherein the electric potential of the reference voltage to be applied to the capacitor is changed when the third electric signal, which is obtained by accumulating the second electric signal output from the MOS transistor into the capacitor in the state that the second switch is OFF, is led to the output signal line as a noise signal for the purpose of a difference in the sensitivity due to threshold characteristics of the MOS transistor is detected.

7. A solid state image pickup device according to claim 5 further comprising:

a second switch for electrically connecting and disconnecting the photoelectric converting element and the MOS transistor, wherein the electric potential of the reference voltage to be applied to the capacitor is changed when the third electric signal, which is obtained by accumulating the second electric signal output from the MOS transistor into the capacitor in the state that the second switch is ON, is led as an image signal to the output signal line for an image pickup operation.

8. A solid state image pickup device according to claim 5 further comprising:

a second switch for electrically connecting and disconnecting the photoelectric converting element and the MOS transistor, wherein the electric potential of the reference voltage to be applied to the capacitor is changed when the third electric signal, which is obtained by accumulating the second electric signal output from the MOS transistor into the capacitor in the state that the second switch is OFF, is led to the output signal line as a noise signal for the purpose of a difference in the sensitivity due to threshold characteristics of the MOS transistor is detected, and wherein the electric potential of the reference voltage to be applied to the capacitor is changed when the third electric signal, which is obtained by accumulating the second electric signal output from the MOS transistor into the capacitor in the state that the second switch is ON, is led as an image signal to the output signal line for an image pickup operation.

9. A solid state image pickup device according to claim 8, wherein the reference voltage is ternary.

10. A solid state image pickup device according to claim 9, wherein a change width of the electric potential of the reference voltage at the time of leading the image signal is set to be larger than a change width of the electric potential of the reference voltage at the time of leading the noise signal.

11. A solid state image pickup device comprising a plurality of pixels and an output signal line for leading output signals output from the pixels, wherein each of the pixels has a photoelectric converting element for generating a first electric signal according to a quantity of incident light, a MOS transistor to which a predetermined bias voltage is applied and which converts the first electric signal output from the photoelectric converting element into a second electric signal proportional to a logarithm value of the incident light quantity so as to output an electric signal, a capacitor in which the second electric signal output from the MOS transistor is given to its one end so as to be integrated and of which a reference voltage whose electric potential is variable is applied to the other end, a first switch for electrically connecting and disconnecting the photoelectric converting element and the MOS transistor, and a second switch for electrically connecting and disconnecting the integrating capacitor and the output signal line, wherein, when an image pickup operation is performed, the second electric signal, which is obtained by logarithmically converting an electric signal from the photoelectric converting element by means of the MOS transistor in a state that the first switch is ON, is integrated by the capacitor so that an image signal is generated, and the image signal is output to the output signal line in a state that the second switch is ON, wherein, when dispersion of sensitivity of the pixels is detected, a noise signal is generated in such a manner that the capacitor integrates the second electric signal according to threshold characteristics of the MOS transistor in a state that the first switch is OFF, and the noise signal is output to the output signal line in a state that the second switch is ON, and wherein the electric potential of the reference voltage is changed in synchronization with at least one of the operation of the second switch at the time of the image pickup operation and detecting the dispersion of sensitivity of the pixels.

12. A solid state image pickup device according to claim 11, wherein when the noise signal and the image signal are output to the output signal line respectively, the electric potential of the reference voltage is changed.

13. A solid state image pickup device according to claim 12, wherein a change width of the electric potential of the reference voltage at the time of leading the image signal is set to be larger than a change width of the electric potential of the reference voltage at the time of leading the noise signal.

14. A solid state image pickup device according to claim 11, wherein the MOS transistor is a P-channel MOS transistor.

15. A solid state image pickup device according to claim 14, wherein the electric potential of the reference voltage is changed to a negative direction in synchronization with an operation of the second switch.

16. A solid state image pickup device according to claim 11,
wherein the MOS transistor is an N-channel MOS transistor.

17. A solid state image pickup device according to claim 16,
wherein the electric potential of the reference voltage is changed to a positive direction in synchronization with an operation of the second switch.

18. A solid state image pickup device according to claim 11, wherein each of the pixels further includes an MOS transistor operating as amplifier for amplifying the second electric signal integrated by the capacitor and leading an electric signal amplified to the output signal line.

\* \* \* \* \*